(No Model.)

B. J. HARDIN.
BOLT.

No. 282,077. Patented July 31, 1883.

Attest.
H. A. Clark.
P. B. Turpin.

Inventor.
Benoni J. Hardin
By R. S. & A. P. Lacey
Attys

UNITED STATES PATENT OFFICE.

BENONI J. HARDIN, OF SPRINGFIELD, KENTUCKY.

BOLT.

SPECIFICATION forming part of Letters Patent No. 282,077, dated July 31, 1883.

Application filed March 27, 1883. (No model.)

*To all whom it may concern:*

Be it known that I, BENONI J. HARDIN, a citizen of the United States, residing at Springfield, in the county of Washington and State of Kentucky, have invented certain new and useful Improvements in Bolts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in timber-fastenings wherein it is desired to secure two or more timbers permanently together; and it consists in bolts provided with suitable heads and tapered or inclined on one side, and provided on their inclined side with ratchet-teeth, and adapted to be used substantially as will be hereinafter described.

Figure 1:
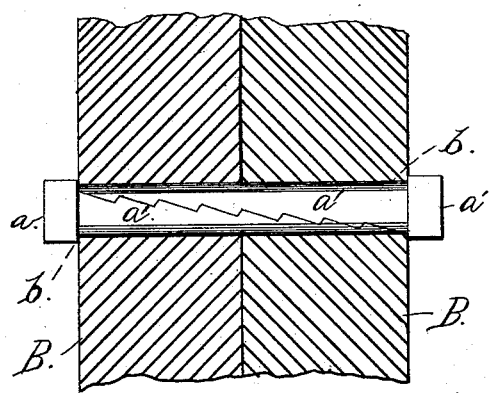
Figure 2:
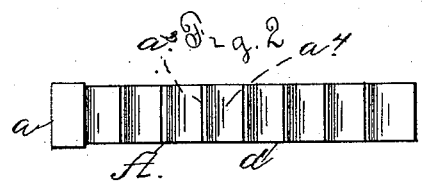
Figure 3:
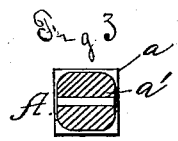
Figure 4:

In the drawings, Figure 1 is a sectional view of two timbers fastened together by my improved fastening-bolts. Fig. 2 is a side view of one of the bolts. Fig. 3 is a cross-sectional view of two of the bolts. Fig. 4 shows the manner in which the bolts are applied, as will be described.

The fastening devices are bolts A, provided with suitable heads, and having shanks $a'$, which are tapered or inclined on one side from the head $a$ to the point or opposite end, terminating at the said end in a thin edge, as clearly shown in Figs. 1 and 4. On this inclined side I form ratchet-teeth $a^2$, having their square or engaging faces $a^3$ arranged toward the heads $a$, and their other faces, or back, $a^4$, inclined toward the thin edge of the shank, as shown in Figs. 1 and 4. These bolts are preferably made semi-oval in cross-section, as shown in Fig. 3; but they may be made of any suitable cross-sectional shape to conform to the shape of the hole bored through the timbers to be fastened.

In using my invention two or more timbers, B B, are provided with holes $b$, which may be bored or chiseled, as desired, and made of a diameter slightly smaller than that of the shanks of the bolts to be used. The timbers are moved to bring the holes $b\ b$ coincident, and two bolts, A, are inserted, one from each side, so that their inclined faces will engage each other, as shown in Fig. 4, and the bolts are driven in from each side until their heads bear against the outer side of the timbers, as shown in Fig. 1, when the bolts will be interlocked and the said timbers will be permanently secured together.

When it is desired to use the bolts, in cases where the combined thickness of the timbers to be fastened is less than the length of the bolts, a portion of the shank may be cut off.

In case the combined thickness of the timbers to be fastened is greater than the length of the shank, when the said bolts have been driven in from opposite sides as far as can be done, the portion of the ratchet-faces engaging will interlock and hold the timbers together; but better results will be had when the length of bolt is equal to the combined thickness of the couple or more of timbers to be fastened together.

When great strength in the fastening is not necessary, a single bolt may be used to accomplish the fastening, by putting a plug into one of the timbers; or the hole therein may be made small, so that when the point of the bolt is forced therein its teeth will be engaged by the plug or the walls of the hole and lock the timbers firmly together. I prefer, however, the use of the two bolts, as before described.

I am aware that prior to my invention sectional tapering bolts have been provided with interlocking ratchet-surfaces. I therefore do not claim such broadly; but What I do claim, and desire to secure by Letters Patent, is—

A bolt formed in two sections, the body or shank of each section tapering from the head to the point, the faces of the taper surface being provided with interlocking ratchet-teeth, the bolt-heads extending above the ratchet-face of the shank, whereby the point of each section fits against the bolt-head of the engaging section when the sections are driven together, substantially as described, and for the purposes set forth.

In testimony whereof I affix my signature in presence of two witnesses.

BENONI J. HARDIN.

Witnesses:
I. H. THURMAN,
REDMOND GRIGSBY.